US010051503B2

(12) United States Patent
Yang et al.

(10) Patent No.: US 10,051,503 B2
(45) Date of Patent: Aug. 14, 2018

(54) METHOD, SYSTEM AND DEVICE FOR REPORTING MOVEMENT INFORMATION

(71) Applicant: China Academy of Telecommunications Technology, Beijing (CN)

(72) Inventors: Xing Yang, Beijing (CN); Jing Liang, Beijing (CN); Wei Bao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 238 days.

(21) Appl. No.: 15/023,119

(22) PCT Filed: Sep. 22, 2014

(86) PCT No.: PCT/CN2014/087057
§ 371 (c)(1),
(2) Date: Mar. 18, 2016

(87) PCT Pub. No.: WO2015/039625
PCT Pub. Date: Mar. 26, 2015

(65) Prior Publication Data
US 2016/0295441 A1 Oct. 6, 2016

(30) Foreign Application Priority Data

Sep. 23, 2013 (CN) .......................... 2013 1 0436131

(51) Int. Cl.
*H04L 12/28* (2006.01)
*H04W 24/10* (2009.01)
(Continued)

(52) U.S. Cl.
CPC .......... *H04W 24/10* (2013.01); *H04L 43/065* (2013.01); *H04W 4/025* (2013.01); *H04W 8/24* (2013.01); *H04W 76/27* (2018.02)

(58) Field of Classification Search
USPC ......................................... 370/252, 329, 386
See application file for complete search history.

(56) References Cited

U.S. PATENT DOCUMENTS 9,591,502 B2 * 3/2017 Fu .......................... H04W 24/10
2010/0317349 A1 12/2010 Serravalle
(Continued)

FOREIGN PATENT DOCUMENTS

CN     101909322 A    12/2010
CN     103501517 A     1/2014
(Continued)

OTHER PUBLICATIONS

Chinese Office Action dated Dec. 23, 2015, for CN Application No. 201310436131.X, 13 pages.
(Continued)

Primary Examiner — John Pezzlo
(74) Attorney, Agent, or Firm — Morgan, Lewis & Bockius LLP

(57) ABSTRACT

The present disclosure provides a method, a system and a device for reporting movement information. The method includes steps of determining, by the UE, that the UE is being or has been switched from an idle state into a connection state; and reporting, by the UE, movement information of the UE to a network-side device.

15 Claims, 6 Drawing Sheets

(51) Int. Cl.
*H04W 76/27* (2018.01)
*H04W 8/24* (2009.01)
*H04L 12/26* (2006.01)
*H04W 4/02* (2018.01)
*H04J 1/16* (2006.01)

(56) References Cited

U.S. PATENT DOCUMENTS

| | | | |
|---|---|---|---|
| 2012/0088509 A1 | 4/2012 | Yi | |
| 2013/0189973 A1* | 7/2013 | Chang | H04W 24/04 455/423 |
| 2013/0225169 A1* | 8/2013 | Farnsworth | H04W 60/04 455/436 |
| 2013/0229931 A1* | 9/2013 | Kim | H04W 24/10 370/252 |
| 2015/0045021 A1* | 2/2015 | Schlatter | H04W 48/20 455/434 |
| 2015/0271789 A1 | 9/2015 | Gao et al. | |
| 2016/0295441 A1 | 10/2016 | Yang et al. | |

FOREIGN PATENT DOCUMENTS

| | | |
|---|---|---|
| CN | 103581886 A | 2/2014 |
| CN | 103596217 A | 2/2014 |
| JP | 2011-511488 A | 4/2011 |
| WO | WO 2007/088381 A1 | 8/2007 |
| WO | WO 2010/005416 A1 | 1/2010 |
| WO | WO 2010/105416 A1 | 9/2010 |
| WO | WO 2013/022392 A1 | 2/2013 |

OTHER PUBLICATIONS

Ericsson, St-Ericsson, "Mobility information at RRC Connection Establishment," 3GPP-TSG RAN WG2 #83, Barcelona, Spain, Aug. 19-23, 2013, 10 pages.
Extended European Search Report dated Aug. 16, 2016, for EP Application No. 14846359.9, 10 pages.
Fujitsu, "Consideration on the mobility information reporting," 3GPP TSG RAN WG2 Meeting #83, Barcelona, Spain, Aug. 19-23, 2013, 2 pages.
International Search Report and Written Opinion dated Dec. 24, 2014, for International Application No. PCT/CN2014/087057, 20 pages.
Japanese Notification of Reasons for Refusal for JP Application No. 2016-541801, 5 pages.
Korean Notification of Reason for Refusal dated Jan. 16, 2017, for KR Application No. 10-2016-7006039, 10 pages.
Potevio, "Enhanced Mobility State Estimation and reporting," 3GPP TSG-RAN WG2 Meeting #78, Prague, Czech Republic, May 21-25, 2012, 4 pages.
Renesas Mobile Europe Ltd., "Summary of email discussion [77#33] LTE: Mobility State Estimation Enhancements," 3GPP TSG-RAN WG2 #77BIS, Jeju, Korea, Mar. 26-30, 2012, 24 pages.
Taiwanese Office Action for TW Application No. 103128244, 10 pages.

* cited by examiner

METHOD, SYSTEM AND DEVICE FOR REPORTING MOVEMENT INFORMATION

CROSS-REFERENCE TO RELATED APPLICATION

This application is the U.S. National Phase of PCT Application No. PCT/CN2014/087057 filed on Sep. 22, 2014, which claims priority to Chinese Patent Application No. 201310436131.X filed on Sep. 23, 2013, and entitled "Method, System and Device for Reporting Movement Information," which is incorporated herein by reference in its entirety.

TECHNICAL FIELD

The present disclosure relates to the field of wireless communication technology, in particular to a method, a system and a device for reporting movement information.

BACKGROUND

For a mobile communication system, along with the deployment of femtocells, pico cells and micro cells, a traditional homogeneous network merely consisting of macro cells will evolve to become a heterogeneous network (Hetnet) consisting of various types of cells.

As shown in FIG. 1, in a heterogeneous network consisting of both macro cells and pico cells, the macro cells and the pico cells may achieve an identical function, although with different coverage regions. For example, these cells may be used to control switching of User Equipments (UEs). Each pico cell is located within the coverage region of the macro cell, and may have a frequency identical to, or different from, the macro cell.

When the UE moves to an edge of a cell, it is required to switch a serving cell, so as to ensure the service quality. For a traditional switching procedure, when the quality of a signal from an adjacent cell detected by the UE meets a certain specific measurement event for a period of time, e.g., time-to-trigger (TTT), the switching may be triggered. When the UE moves at a high speed, the signal quality at the serving cell may be degraded quickly. At this time, when the TTT is longer, the cell switching may be later, resulting in a wireless link failure for the UE. When the network can acquire movement information of the UE, it is able to configure a shorter TTT for the UE at a high speed, so as to switch the UE into a target cell timely, thereby to ensure the communication performance.

In the case of the heterogeneous network, the system performance may be affected by the speed of the UE. At a network side, parameter configuration may be optimized in accordance with the movement information of the UE, e.g., relevant parameters may be switched or the parameters may be measured at different frequencies, so as to ensure the entire communication performance.

However, it is currently able for the network side to acquire the movement information of the UE in accordance with its cell switching times after the UE has been switched into a connection state for a period of time. Before the acquisition of the movement information, it is impossible to optimize the parameter configuration. Hence, the entire communication performance may be adversely affected.

In a word, it is merely able for the network side, after the UE has been switched into the connection state for a period of time, to acquire the movement information of the UE in accordance with its cell switching times. Hence, it is impossible to optimize the parameter configuration for the UE in time, thereby the entire communication performance may be adversely affected.

SUMMARY

An object of the present disclosure is to provide a method, a system and a device for reporting movement information, so as to overcome the above-mentioned drawbacks in the related art.

In one aspect, the present disclosure provides in some embodiments a method for reporting movement information, including steps of determining, by a UE, that the UE is being or has been switched from an idle state into a connection state, and reporting, by the UE, movement information of the UE to a network-side device.

According to the embodiments of the present disclosure, the movement information of the UE is reported by the UE to the network-side device immediately when or after the UE is switched from the idle state into the connection state. As a result, it is able to shorten the time desired for the network-side device to acquire the movement information of the UE, thereby to optimize parameter configuration for the UE quickly, and prevent the entire communication performance from being adversely affected due to the delayed optimization of the parameter configuration.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The step of reporting, by the UE, the movement information of the UE to the network-side device includes reporting, by the UE, the first movement information to the network-side device, and reporting, by the UE, the second movement information to the network-side device when it is determined that the network-side device needs to receive the second movement information.

Alternatively, the movement information includes the second movement information. The step of reporting, by the UE, the movement information of the UE to the network-side device includes reporting, by the UE, an empty message to the network-side device, and reporting, by the UE, the second movement information to the network-side device when it is determined that the network-side device needs to receive the second movement information.

Alternatively, when configuration information representing that the second movement information needs to be reported is received by the UE from the network-side device, the UE determines that the network-side device needs to receive the second movement information, and when configuration information representing that the second movement information does not need to be reported is received by the UE from the network-side device or no configuration information is received from the network-side device within a predetermined time period after the first movement information has been reported, the UE determines that the network-side device does not need to receive the second movement information.

The UE performs the processing in accordance with the configuration information from the network-side device, so it is able to control the UE by the network-side device.

Alternatively, prior to determining by the UE that the network-side device needs to receive the second movement information, the method further includes reporting, by the UE, information representing whether or not there is the second movement information to the network-side device.

The UE performs the processing in accordance with the configuration information from the network-side device, so it is able to control the UE by the network-side device.

Alternatively, prior to reporting by the UE the first movement information to the network-side device, the method further includes receiving, by the UE, the configuration information representing that the first movement information needs to be reported from the network-side device.

The UE performs the processing in accordance with the configuration information from the network-side device, so it is able to control the UE by the network-side device.

In another aspect, the present disclosure provides in some embodiments a method for receiving movement information, including steps of determining, by a network-side device, that a UE is being or has been switched from an idle state into a connection state, and receiving, by the network-side device, movement information reported by the UE.

According to the embodiments of the present disclosure, the movement information of the UE is reported by the UE to the network-side device immediately when or after the UE is switched from the idle state into the connection state. As a result, it is able to shorten the time desired for the network-side device to acquire the movement information of the UE, thereby to optimize parameter configuration for the UE quickly, and prevent the entire communication performance from being adversely affected due to the delayed optimization of the parameter configuration.

Alternatively, the movement information includes first movement information and/or second movement information. The first movement information is information representing a movement state of the UE and determined according to mobility state estimation which is performed on the UE. The second movement information is historical information about cell reselection of the UE.

The UE performs the processing in accordance with the configuration information from the network-side device, so it is able to control the UE by the network-side device.

Alternatively, the movement information includes the first movement information and the second movement information. The step of receiving, by the network-side device, the movement information reported by the UE includes receiving, by the network-side device, the first movement information reported by the UE, transmitting, by the network-side device, configuration information representing that the second movement information needs to be reported to the UE when it is determined that the network-side device needs to receive the second movement information, and receiving, by the network-side device, the second movement information reported by the UE.

The UE performs the processing in accordance with the configuration information from the network-side device, so it is able to control the UE by the network-side device.

Alternatively, the method further includes transmitting, by the network-side device, configuration information representing that the second movement information does not need to be reported to the UE when it is determined that the network-side device does not need to receive the second movement information, or not performing configuration on the UE.

The UE performs the processing in accordance with the configuration information from the network-side device, so it is able to control the UE by the network-side device.

Alternatively, prior to receiving by the network-side device the first movement information reported by the UE, the method further includes transmitting, by the network-side device, the configuration information representing that the first movement information needs to be reported to the UE when it is determined that the network-side device needs to receive the first movement information.

The UE performs the processing in accordance with the configuration information from the network-side device, so it is able to control the UE by the network-side device.

In yet another aspect, the present disclosure provides in some embodiments a UE for reporting movement information, including a first determination module configured to determine that the UE is being or has been switched from an idle state into a connection state, and a reporting module configured to report movement information of the UE to a network-side device.

According to the embodiments of the present disclosure, the movement information of the UE is reported by the UE to the network-side device immediately when or after the UE is switched from the idle state into the connection state. As a result, it is able to shorten the time desired for the network-side device to acquire the movement information of the UE, thereby to optimize parameter configuration for the UE quickly, and prevent the entire communication performance from being adversely affected due to the delayed optimization of the parameter configuration.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The reporting module is configured to report the first movement information to the network-side device, and report the second movement information to the network-side device when it is determined that the network-side device needs to receive the second movement information.

Alternatively, the movement information includes the second movement information. The reporting module is configured to report an empty message to the network-side device, and report the second movement information to the network-side device when it is determined that the network-side device needs to receive the second movement information.

Alternatively, when configuration information representing that the second movement information needs to be reported is received from the network-side device, the reporting module determines that the network-side device needs to receive the second movement information, and when configuration information representing that the second movement information does not need to be reported is received from the network-side device or no configuration information is received from the network-side device within a predetermined time period after the first movement information has been reported, the reporting module determines that the network-side device does not need to receive the second movement information.

Alternatively, the reporting module is further configured to, prior to determining that the network-side device needs to receive the second movement information, report information representing whether or not there is the second movement information of the UE to the network-side device.

Alternatively, the reporting module is further configured to, when the configuration information representing that the first movement information needs to be reported is received from the network-side device, report the first movement information to the network-side device.

In still yet another aspect, the present disclosure provides in some embodiments a network-side device for receiving movement information, including a second determination module configured to determine that a UE is being or has been switched from an idle state into a connection state, and a processing module configured to receive movement information reported by the UE.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The processing module is configured to receive the first movement information reported by the UE, transmit configuration information representing that the second movement information needs to be reported to the UE when it is determined that the network-side device needs to receive the second movement information, and receive the second movement information reported by the UE.

Alternatively, the processing module is further configured to transmit configuration information representing that the second movement information does not need to be reported to the UE when it is determined that the network-side device does not need to receive the second movement information, or not perform configuration on the UE.

Alternatively, the processing module is further configured to, prior to receiving the first movement information reported by the UE, transmit the configuration information representing that the first movement information needs to be reported to the UE when it is determined that the network-side device needs to receive the first movement information.

In still yet another aspect, the present disclosure provides in some embodiments a system for reporting movement information, including a UE configured to determine that it is being or has been switched from an idle state into a connection state, and report movement information to a network-side device, and the network-side device configured to determine that the UE is being or has been switched from the idle state into the connection state, and receive the movement information reported by the UE.

In still yet another aspect, the present disclosure provides in some embodiments a UE, including a processor, a memory and a transceiver. The memory is configured to store one or more executable programs for configuring the processor. The processor is configured with the one or more executable programs, so as to enable the UE to determine that it is being or has been switched from an idle state into a connection state, and enable the UE to report movement information of the UE to a network-side device.

In still yet another aspect, the present disclosure provides in some embodiments a network-side device, including a processor, a memory and a transceiver. The memory is configured to store one or more executable programs for configuring the processor. The processor is configured to determine that a UE is being or has been switched from an idle state into a connection state, and receive movement information reported by the UE via the transceiver.

According to the embodiments of the present disclosure, the movement information of the UE is reported by the UE to the network-side device immediately when or after the UE is switched from the idle state into the connection state. As a result, it is able to shorten the time desired for the network-side device to acquire the movement information of the UE, thereby to optimize parameter configuration for the UE quickly, and prevent the entire communication performance from being adversely affected due to the delayed optimization of the parameter configuration.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

According to the embodiments of the present disclosure, movement information of a UE is reported by the UE to a network-side device immediately when or after the UE is switched from an idle state into a connection state. As a result, it is able to shorten the time desired for the network-side device to acquire the movement information of the UE, thereby to optimize parameter configuration for the UE quickly, and prevent the entire communication performance from being adversely affected due to the delayed optimization of the parameter configuration.

The present disclosure will be described hereinafter in conjunction with the drawings and embodiments.

Figure 1:
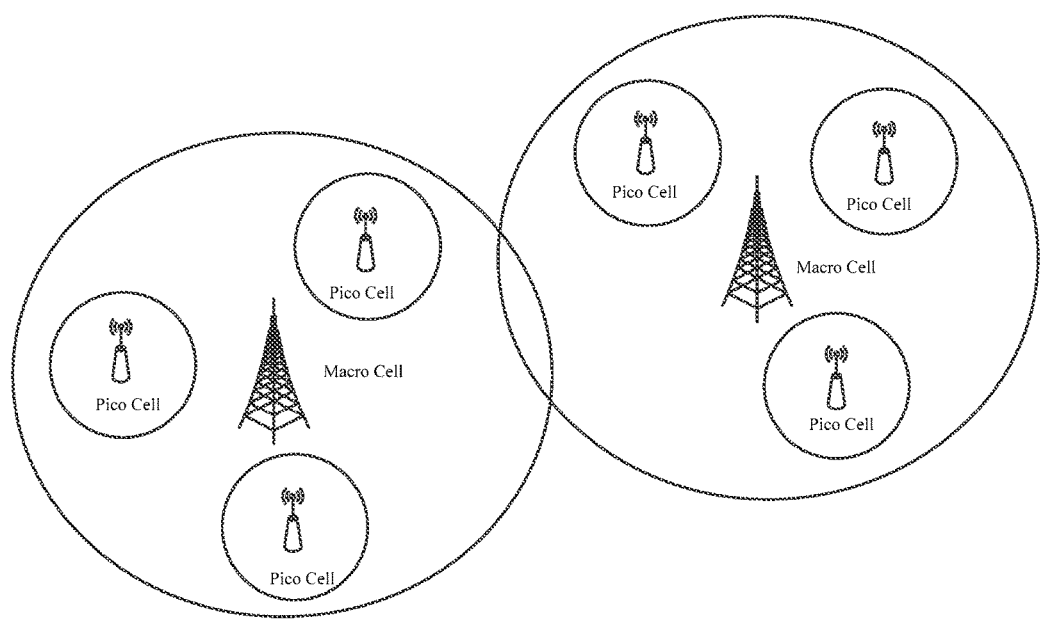
FIG. 1 is a schematic view showing an existing heterogeneous network.
Figure 2:
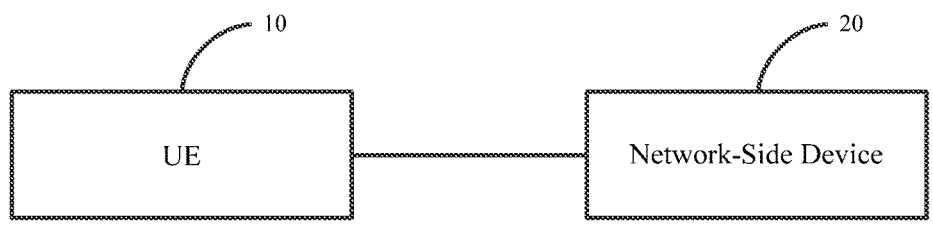
FIG. 2 is a schematic view showing a system for reporting movement information according to one embodiment of the present disclosure.

As shown in FIG. 2, a system for reporting movement information according to some embodiments of the present disclosure includes a UE 10 configured to determine that it is being or has been switched from an idle state into a connection state and report movement information to a network-side device, and the network-side device 20 configured to determine that the UE is being or has been switched from the idle state into the connection state and receive the movement information reported by the UE.

The movement information includes first movement information and/or second movement information. The first movement information is information representing a movement state of the UE and determined according to mobility state estimation which is performed on the UE, e.g., a Mobility State Estimation (MSE) result (which may include high speed, middle speed, low speed and null). The second movement information is historical information about cell reselection of the UE.

The movement information will be described in details hereinafter.

In a first mode, the movement information includes the first movement information and the second movement information.

The first movement information is reported to the network-side device immediately when or after the UE is switched into the connection state, and the second movement information is reported to the network-side device after it is determined that the network-side device needs to receive the second movement information.

Alternatively, the UE may determine whether or not the network-side device needs to receive the second movement information as follows. When the UE receives from the network-side device configuration information representing that the second movement information needs to be reported, it determines that the network-side device needs to receive the second movement information. When the UE receives from the network-side device configuration information representing that the second movement information does not need to be reported or no configuration information is received from the network-side device within a predetermined time period after the first movement information has been reported, the UE determines that the network-side device does not need to receive the second movement information.

Correspondingly, the network-side device receives the first movement information reported by the UE, transmit the configuration information representing that the second movement information needs to be reported to the UE after it is determined that the second movement information needs to be received, and receive the second movement information reported by the UE.

After it is determined that the network-side device does not need to receive the second movement information, it may transmit configuration information representing that the second movement information does not need to be reported to the UE, or no configuration is performed on the UE.

In order to help the network-side device to determine whether or not it needs to receive the second movement information, alternatively, information representing whether or not there is the second movement information may be reported to the network-side device before the UE determines that the network-side device needs to receive the second movement information. The information representing whether or not there is the second movement information may be reported together with the first movement information.

In some embodiments, in order to control the UE, the network-side device may transmit to the UE the configuration information representing that the first movement information needs to be reported after it is determined that the network-side device needs to receive the first movement information. Correspondingly, the UE may report the first movement information after it receives from the network-side device the configuration information representing that the first movement information needs to be reported.

When the network-side device does not need to receive the first movement information, it may transmit to the UE the configuration information representing that the first movement information does not need to be reported, or no configuration is performed on the UE. Correspondingly, when the UE receives the configuration information representing that the first movement information does not need to be reported or no relevant configuration information is received within a predetermined time period after the UE has been switched into the connection state, it may not report the first movement information.

In some embodiments, when it is required to trigger, by the network-side device, the UE to report the movement information, the movement information may be reported only when the UE determines that the network-side device needs to receive the movement information. When it is not required to trigger, by the network-side device, the UE to report the movement information, the movement information may be reported after the UE has been switched into the connection state. The movement information to be reported by the UE may include the first movement information and/or the second movement information.

In a second mode, the movement information includes the second movement information.

In some embodiments, probably some UEs may not have the ability to acquire the first movement information, and at this time, merely the second movement information may be reported.

To be specific, an empty message may be reported by the UE to the network-side device immediately when or after the UE is switched into the connection state, and when it is determined that the network-side device needs to receive the second movement information, the second movement information may be reported to the network-side device.

In some embodiments, the UE may not report the empty message to the network-side device, and instead, it may directly determine whether or not the network-side device needs to receive the second movement information after the UE has been switched into the connection state.

Alternatively, the UE may determine whether or not the network-side device needs to receive the second movement information as follows. When the UE receives from the network-side device the configuration information representing that the second movement information needs to be reported, it may determine that the network-side device needs to receive the second movement information. When the UE receives from the network-side device the configuration information representing that the second movement information does not need to be reported or no configuration information is received within a predetermined time period after the first movement information has been reported, it may determine that the network-side device does not need to receive the second movement information.

Correspondingly, the network-side device receives the first movement information reported by the UE, transmits the configuration information representing that the second movement information needs to be reported to the UE after it is determined that the second movement information needs to be received, and receive the second movement information reported by the UE.

After it is determined that the second movement information does not need to be received, the network-side device may transmit the configuration information representing that the second movement information does not need to be reported to the UE, or no configuration may be performed on the UE.

In order to help the network-side device to determine whether or not it needs to receive the second movement information, alternatively, the information representing whether or not there is the second movement information may be reported to the network-side device before it is determined that the network-side device needs to receive the second movement information. The information representing whether or not there is the second movement information may be reported together with the empty message. Of course, the UE may merely report the information representing whether or not there is the second movement information.

In some embodiments, in order to control the UE, the configuration information representing that the first movement information needs to be reported may be transmitted by the network-side device to the UE after it is determined that the network-side device needs to receive the first movement information. Correspondingly, after the UE receives from the network-side device the configuration information representing that the first movement information needs to be reported, the empty message may be reported.

When the network-side device does not need to receive the first movement information, it may transmit to the UE the configuration information representing that the first movement information does not need to be reported, or no configuration may be performed on the UE. Correspondingly, when the UE receives the configuration information representing that the first movement information does not need to be reported or no relevant configuration information is received within a predetermined time period after the UE has been switched into the connection state, no empty message may be reported.

In some embodiments, when it is required to trigger, by the network-side device, the UE to report the movement information, the movement information may be reported only when it is determined that the network-side device needs to receive the movement information. When it is not required to trigger, by the network-side device, the UE to report the movement information, the movement information may be reported by the UE after it has been switched into the connection state. The movement information to be reported may include the first movement information and/or the second movement information.

In a third mode, the movement information includes the first movement information.

In some embodiments, probably some UEs may not have the ability to acquire the second movement information, and at this time, merely the first movement information may be reported.

To be specific, the first movement information may be reported by the UE to the network-side device immediately when or after the UE is switched into the connection state. Correspondingly, the network-side device may receive the first movement information.

In order to help the network-side device to determine whether or not it needs to receive the second movement information, alternatively, the UE may report the information representing whether or not there is the second movement information to the network-side device before it is determined that the network-side device needs to receive the second movement information. The information representing whether or not there is the second movement information may be reported together with the first movement information.

In order to control the UE, in some embodiments, the network-side device may transmit to the UE the configuration information representing that the first movement information needs to be reported after it is determined that the network-side device needs to receive the first movement information. Correspondingly, the first movement information may be reported after the UE receives from the network-side device the configuration information representing that the first movement information needs to be reported.

When the network-side device does not need to receive the first movement information, it may transmit to the UE the configuration information representing that the first movement information does not need to be reported, or no configuration may be performed on the UE. Correspondingly, when the UE receives the configuration information representing that the first movement information does not need to be reported or no relevant configuration information is received within a predetermined time period after the UE has been switched into the connection state, the first movement information may not be reported.

In some embodiments, when it is required to trigger, by the network-side device, the UE to report the first movement information, the first movement information may be reported only when it is determined that the network-side device needs to receive the first movement information. When it is not required to trigger, by the network-side device, the UE to report the first movement information, the first movement information may be reported after the UE has been switched into the connection state.

In the above modes, when there is the second movement information, the information representing whether or not there is the second movement information is just information representing that there is the second movement information, and where there is not the second movement information, the information representing whether or not there is the second movement information is just information representing that there is not the second movement information.

In the above modes, the configuration may be performed by the network-side device on the UE through broadcasting or radio resource control (RRC) dedicated signaling.

The present disclosure will be further described hereinafter in conjunction with some specific embodiments.

First Embodiment: The UE Supports the MSE in the Idle State and Store a History of Cells to which the UE has Ever Accessed The UE performs the MSE in the idle state to estimate its own movement state as high speed, and stores the history of the cells to which the UE has ever accessed, including cell identifiers for 10 cells to which the UE has recently accessed and pace time for each cell. When the UE is switched into the connection state, a high-speed movement state and a capability identifier 1 representing that the UE has the capability to report the history may be reported to the network-side device.

Upon receiving the high-speed movement state and the capability identifier 1, the network-side device may determine that the history needs to be reported in accordance with a current network deployment mode (Hetnet), the high-speed movement state and the capability identifier 1, and transmit a reporting identifier a to the UE through RRC dedicated signaling.

Upon receiving the RRC dedicated signaling, the UE may determine the reporting identifier as a, and report the history to the network-side device. The network-side device may then acquire the movement information of the UE in a more accurate manner in accordance with the history.

Second Embodiment: The UE Supports the MSE in the Idle State and Store a History of Cells to which the UE has Ever Accessed The UE performs the MSE in the idle state to estimate its own movement state as high speed, and stores the history of the cells to which the UE has ever accessed, including cell identifiers for 10 cells to which the UE has recently accessed and pace time for each cell. When the UE is switched into the connection state, a high-speed movement state and a capability identifier 1 representing that the UE has the capability to report the history may be reported to the network-side device.

Upon receiving the high-speed movement state and the capability identifier 1, the network-side device may determine that the UE does not need to report in accordance with a current network deployment mode (macro only), the high-speed movement state and the capability identifier 1, and transmit a reporting identifier b to the UE through RRC dedicated signaling, or no reporting identifier may be transmitted to the UE.

Upon receiving the RRC dedicated signaling, the UE may determine the reporting identifier as b or determine that no reporting identifier has been received, and at this time, the history may not be reported.

Third Embodiment: The UE does not Support the MSE in the Idle State but May Store a History of Cells to which the UE has Ever Accessed In the idle state, the UE stores the history of the cells to which the UE has ever accessed, including cell identifiers for 10 cells to which the UE has recently accessed and pace time for each cell. When the UE is switched into the connection state, a null movement state and a capability identifier 1 representing that the UE has the capability to report the history may be reported to the network-side device.

Upon receiving the null movement state and the capability identifier 1, the network-side device may determine that the history needs to be reported in accordance with a current network deployment mode (Hetnet) and the capability identifier 1, and transmit a reporting identifier a to the UE through RRC dedicated signaling.

Upon receiving the RRC dedicated signaling, the UE may determine the reporting identifier as a, and report the history to the network-side device. The network-side device may acquire the movement information of the UE in accordance with the history.

Fourth Embodiment: UE Supports the MSE in the Idle State but May not Store a History of Cells to which the UE has Ever Accessed In the idle state, the UE performs the MSE and estimates its own movement state as high speed. When the UE is switched into the connection state, a high-speed movement state and a capability identifier 2 representing that the UE does not have the capability to report the history may be reported to the network-side device.

Upon receiving the high-speed movement state and the capability identifier 2, the network-side device determines that the history does not need to be reported in accordance with the capability identifier 2, and transmit a reporting identifier b to the UE through RRC dedicated signaling, or no reporting identifier may be transmitted.

Upon receiving the RRC dedicated signaling, the UE may determine the reporting identifier as b or determine that no reporting identifier is received, and at this time, the history may not be reported.

Fifth Embodiment: UE Supports the MSE in the Idle State and May Store a History of Cells to which the UE has Ever Accessed In the idle state, the UE performs the MSE to estimate its own movement state as high speed, and stores the history of the cells to which the UE has ever accessed, including cell identifiers for 10 cells to which the UE has recently accessed and pace time for each cell. When the UE is switched into the connection state, a high-speed movement state may be reported to the network-side device.

Upon receiving the high-speed movement state, the network-side device may determine that the history needs to be reported in accordance with a current network deployment mode (Hetnet) and the high-speed movement state, and transmit a reporting identifier a to the UE through RRC dedicated signaling.

Upon receiving the RRC dedicated signaling, the UE may determine the reporting identifier as a, and then report the history to the network-side device. The network-side device may acquire more movement information of the UE in a more accurate manner in accordance with the history.

Sixth Embodiment: The UE Supports the MSE in the Idle State and May Store a History of Cells to which the UE has Ever Accessed In the idle state, the UE performs the MSE to estimate its own movement state as high speed, and stores the history of the cells to which the UE has ever accessed, including cell identifiers for 10 cells to which the UE has recently accessed and pace time for each cell. The network-side device may transmit an identifier x through broadcasting. When the UE is switched into the connection state and reads the identifier x, it may not report the movement information.

Figure 3:
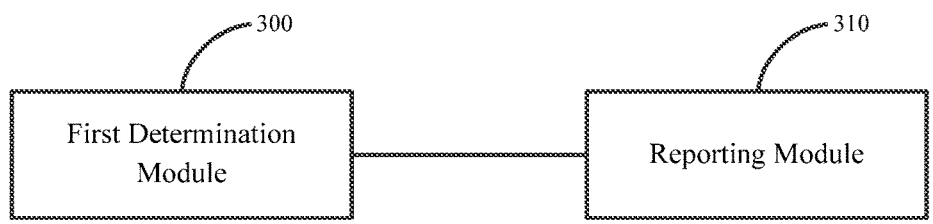
FIG. 3 is a schematic view showing a UE for the system for reporting movement information according to one embodiment of the present disclosure.

As shown in FIG. 3, the present disclosure provides in some embodiments a UE for the system for reporting movement information, which includes a first determination module 300 configured to determine that the UE is being or has been switched from an idle state into a connection state, and a reporting module 310 configured to report movement information of the UE to a network-side device.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The reporting module 310 is configured to report the first movement information to the network-side device, and report the second movement information to the network-side device when it is determined that the network-side device needs to receive the second movement information.

Alternatively, the movement information includes the second movement information. The reporting module 310 is configured to report an empty message to the network-side device, and report the second movement information to the network-side device when it is determined that the network-side device needs to receive the second movement information.

Alternatively, the reporting module 310 may determine whether or not the network-side device needs to receive the second movement information as follows. When configuration information representing that the second movement information needs to be reported is received from the network-side device, the reporting module 310 determines that the network-side device needs to receive the second movement information, and when configuration information representing that the second movement information does not need to be reported is received from the network-side device or no configuration information is received from the network-side device within a predetermined time period after the first movement information has been reported, the reporting module 310 determines that the network-side device does not need to receive the second movement information.

Alternatively, the reporting module 310 is further configured to, prior to determining that the network-side device needs to receive the second movement information, report information representing whether or not there is the second movement information of the UE to the network-side device.

Alternatively, the reporting module 310 is further configured to, when the configuration information representing that the first movement information needs to be reported is received from the network-side device, report the first movement information to the network-side device.

Figure 4:
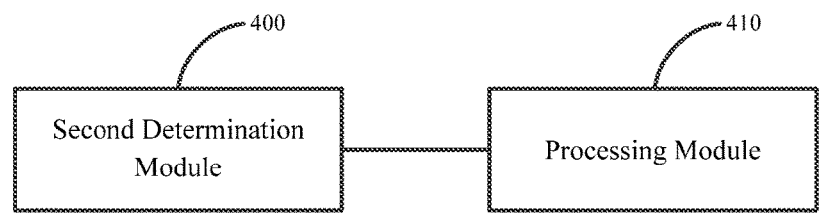
FIG. 4 is a schematic view showing a network-side device for the system for reporting movement information according to one embodiment of the present disclosure.

As shown in FIG. 4, the present disclosure provides in some embodiments a network-side device for the system for reporting movement information, which includes a second determination module 400 configured to determine that a UE is being or has been switched from an idle state into a connection state, and a processing module 410 configured to receive movement information reported by the UE.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The processing module 410 is configured to receive the first movement information reported by the UE, transmit configuration information representing that the second movement information needs to be reported to the UE when it is determined that the network-side device needs to receive the second movement information, and receive the second movement information reported by the UE.

Alternatively, the processing module 410 is further configured to transmit configuration information representing that the second movement information does not need to be reported to the UE, or not perform configuration on the UE, when it is determined that the network-side device does not need to receive the second movement information.

Alternatively, the processing module 410 is further configured to, prior to receiving the first movement information reported by the UE, transmit the configuration information representing that the first movement information needs to be reported to the UE when it is determined that the network-side device needs to receive the first movement information.

Based on an identical inventive concept, the present disclosure further provides in some embodiments another UE and another network-side device. The principles of the UE and the network-side device are similar to that of the above-mentioned system, so the implementation thereof may refer to the implementation of the system.

Figure 5:
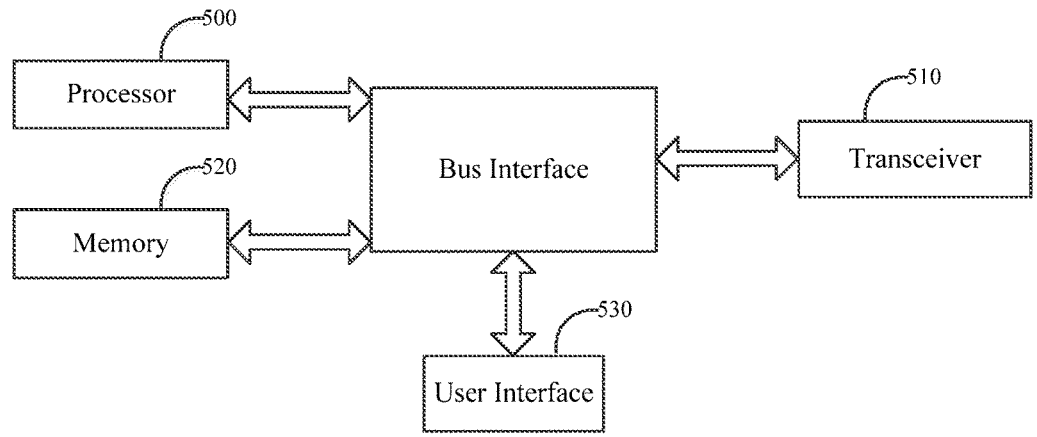
FIG. 5 is another schematic view showing the UE for the system for reporting movement information according to one embodiment of the present disclosure.

As shown in FIG. 5, the present disclosure provides in some embodiments another UE for the system for reporting movement information, which includes a processor 500 and a transceiver 510. The processor 500 is configured to determine that the UE is being or has been switched from an idle state into a connection state, and report the movement information of the UE to the network-side device via the transceiver 510. The transceiver 510 is configured to receive and transmit data under the control of the processor 500.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The processor 500 is configured to report the first movement information to the network-side device via the transceiver 510, and report the second movement information via the transceiver 510 to the network-side device when it is determined that the network-side device needs to receive the second movement information.

Alternatively, the movement information includes the second movement information. The processor 500 is configured to report an empty message to the network-side device via the transceiver 510, and report the second movement information to the network-side device via the transceiver 510 when it is determined that the network-side device needs to receive the second movement information.

Alternatively, the processor 500 may determine whether or not the network-side device needs to receive the second movement information as follows. When configuration information representing that the second movement information needs to be reported is received via the transceiver 510 from the network-side device, the processor 500 determines that the network-side device needs to receive the second movement information, and when configuration information representing that the second movement information does not need to be reported is received via the transceiver 510 from the network-side device or no configuration information is received from the network-side device within a predetermined time period after the first movement information has been reported, the processor 500 determines that the network-side device does not need to receive the second movement information.

Alternatively, the processor 500 is further configured to, prior to determining that the network-side device needs to receive the second movement information, report information representing whether or not there is the second movement information of the UE to the network-side device via the transceiver 510.

Alternatively, the processor 500 is further configured to, when the configuration information representing that the first movement information needs to be reported is received from the network-side device via the transceiver 510, report the first movement information to the network-side device via the transceiver 510.

In FIG. 5, bus architecture may include a number of buses and bridges connected to each other, so as to connect various circuits for one or more processors, represented by the processor 500, and one or more memories, represented by the memory 520. In addition, as is known in the art, the bus architecture may be used to connect any other circuits, such as a circuit for a peripheral device, a circuit for a voltage stabilizer and a power management circuit. Bus interfaces are provided, and the transceiver 510 may consist of a transmitter and a receiver for communication with any other devices over a transmission medium. With respect to different UEs, a user interface 530 may also be provided for devices which are to be arranged inside or outside the UE, and these devices may include but not limited to a keypad, a display, a speaker, a microphone and a joystick. The processor 500 takes charge of managing the bus architecture as well as general processings. The memory 520 may store data desired for the operation of the processor 500.

Figure 6:
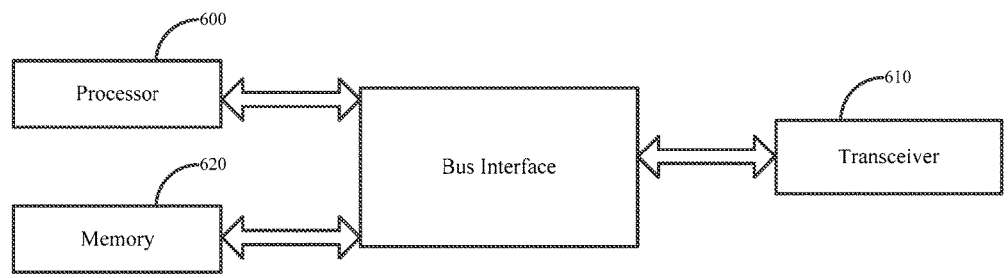
FIG. 6 is another schematic view showing the network-side device for the system for reporting movement information according to one embodiment of the present disclosure.

As shown in FIG. 6, the present disclosure provides in some embodiments another network-side device for the system for reporting movement information, which includes a processor 600 and a transceiver 610. The processor 600 is configured to determine that the UE is being or has been switched into a connection state, and receive movement information reported by the UE via the transceiver 610. The transceiver 610 is configured to receive and transmit data under the control of the processor 600.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The processor 600 is configured to receive via the transceiver 610 the first movement information reported by the UE, and transmit via the transceiver 610 configuration information representing that the second movement information needs to be reported to the UE when it is determined that the network-side device needs to receive the second movement information. The network-side device receives the second movement information reported by the UE.

Alternatively, the processor 600 is further configured to transmit configuration information representing that the second movement information does not need to be reported to the UE, or not perform configuration on the UE, when it is determined that the network-side device does not need to receive the second movement information.

Alternatively, the processor 600 is further configured to, prior to receiving the first movement information reported by the UE via the transceiver 610, transmit the configuration information representing that the first movement information needs to be reported to the UE via the transceiver 610 when it is determined that the network-side device needs to receive the first movement information.

In FIG. 6, bus architecture may include a number of buses and bridges connected to each other, so as to connect various circuits for one or more processors, represented by the processor 600, and one or more memories, represented by the memory 620. In addition, as is known in the art, the bus architecture may be used to connect any other circuits, such as a circuit for a peripheral device, a circuit for a voltage stabilizer and a power management circuit. Bus interfaces are provided, and the transceiver 610 may consist of a transmitter and a receiver for communication with any other devices over a transmission medium. The processor 600 takes charge of managing the bus architecture as well as general processings. The memory 620 may store data desired for the operation of the processor 600.

Based on an identical inventive concept, the present disclosure further provides in some embodiments a method for reporting by the UE the movement information and a method for receiving by the network-side device the movement information. The devices corresponding to these methods are just those in the above-mentioned system for reporting movement information, and the principles thereof are similar to that of the above-mentioned system, so the implementations of these methods may refer to that of the above-mentioned system.

Figure 7:
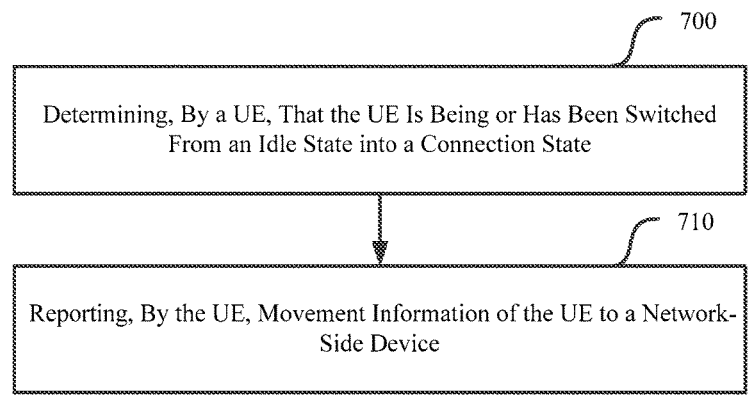
FIG. 7 is a flow chart of a method for reporting movement information by the UE according to one embodiment of the present disclosure.

As shown in FIG. 7, the present disclosure provides in some embodiments a method for reporting movement information, which includes Step 700 of determining, by a UE, that it is being or has been switched from an idle state into a connection state, and Step 710 of reporting, by the UE, movement information of the UE to a network-side device.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The step of reporting, by the UE, the movement information of the UE to the network-side device includes: reporting, by the UE, the first movement information to the network-side device; and reporting, by the UE, the second movement information to the network-side device when it is determined that the network-side device needs to receive the second movement information.

Alternatively, the movement information includes the second movement information. The step of reporting, by the UE, the movement information of the UE to the network-side device includes: reporting, by the UE, an empty message to the network-side device; and reporting, by the UE, the second movement information to the network-side device when it is determined that the network-side device needs to receive the second movement information.

Alternatively, the UE may determine whether or not the network-side device needs to receive the second movement information as follows. When configuration information representing that the second movement information needs to be reported is received by the UE from the network-side device, the UE determines that the network-side device needs to receive the second movement information, and when configuration information representing that the second movement information does not need to be reported is received by the UE from the network-side device or no configuration information is received from the network-side device within a predetermined time period after the first movement information has been reported, the UE determines that the network-side device does not need to receive the second movement information.

Alternatively, prior to determining by the UE that the network-side device needs to receive the second movement information, the method further includes reporting, by the UE, information representing whether or not there is the second movement information to the network-side device.

Alternatively, prior to reporting by the UE the first movement information to the network-side device, the method further includes receiving, by the UE, the configuration information representing that the first movement information needs to be reported from the network-side device.

Figure 8:
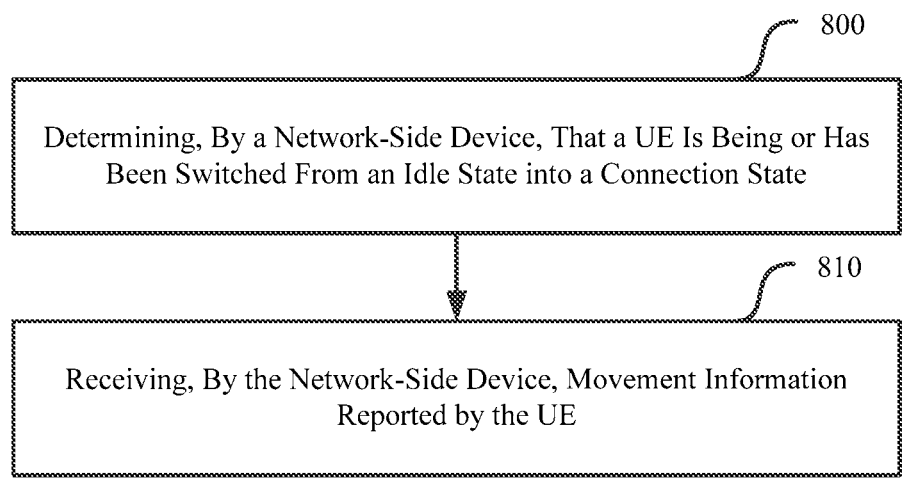
FIG. 8 is a flow chart of a method for receiving movement information by the network-side device according to one embodiment of the present disclosure.

As shown in FIG. 8, the present disclosure provides in some embodiments a method for receiving movement information, which includes Step 800 of determining, by a network-side device, that a UE is being or has been switched from an idle state into a connection state, and Step 810 of receiving, by the network-side device, movement information reported by the UE.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The step of receiving, by the network-side device, the movement information reported by the UE includes: receiving, by the network-side device, the first movement information reported by the UE; transmitting, by the network-side device, configuration information representing that the second movement information needs to be reported to the UE when it is determined that the network-side device needs to receive the second movement information; and receiving, by the network-side device, the second movement information reported by the UE.

Alternatively, the method further includes transmitting, by the network-side device, configuration information representing that the second movement information does not need to be reported to the UE, or not performing configuration on the UE, when it is determined that the network-side device does not need to receive the second movement information.

Alternatively, prior to receiving by the network-side device the first movement information reported by the UE, the method further includes transmitting, by the network-side device, the configuration information representing that the first movement information needs to be reported to the UE when it is determined that the network-side device needs to receive the first movement information.

Figure 9:
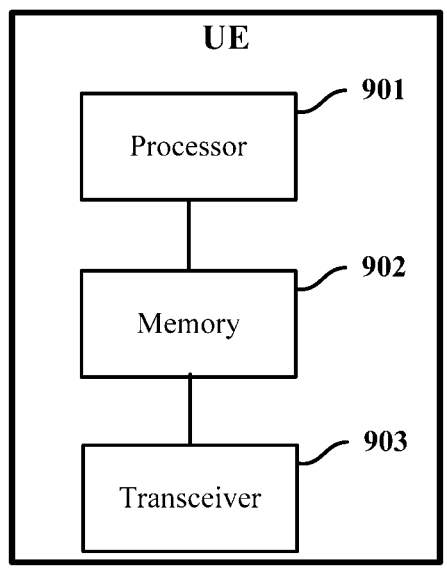
FIG. 9 is yet another schematic view showing the UE according to one embodiment of the present disclosure.

As shown in FIG. 9, the present disclosure provides in some embodiments yet another UE for the system for reporting movement information, which includes a processor 901, a memory 902 and a transceiver 903. The transceiver 903 may include such devices as a baseband processing element and a radio frequency processing element for transmitting relevant information in accordance with the practical need. The memory 902 is configured to store one or more executable programs for configuring the processor. The processor 901 is configured with the one or more executable programs, so as to enable the UE to determine that it is being or has been switched from an idle state into a connection state, and enable the UE to report movement information of the UE to a network-side device via the transceiver 903.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The processor 901 is configured to report the first movement information to the network-side device via the transceiver 903, and report the second movement information to the network-side device when it is determined that the network-side device needs to receive the second movement information.

Alternatively, the movement information includes the second movement information. The processor 901 is configured to report an empty message to the network-side device via the transceiver 903, and report the second movement information to the network-side device via the transceiver 903 when it is determined that the network-side device needs to receive the second movement information.

Alternatively, the processor 901 may determine whether or not the network-side device needs to receive the second movement information as follows. When configuration information representing that the second movement information needs to be reported is received from the network-side device, the processor 901 determines that the network-side device needs to receive the second movement information, and when configuration information representing that the second movement information does not need to be reported is received from the network-side device or no configuration information is received from the network-side device within a predetermined time period after the first movement information has been reported, the processor 901 determines that the network-side device does not need to receive the second movement information.

Alternatively, the processor 901 is further configured to, prior to determining that the network-side device needs to receive the second movement information, report information representing whether or not there is the second movement information of the UE to the network-side device via the transceiver 903.

Alternatively, the processor 901 is further configured to, when the configuration information representing that the first movement information needs to be reported is received from the network-side device, report the first movement information to the network-side device via the transceiver 903.

Figure 10:
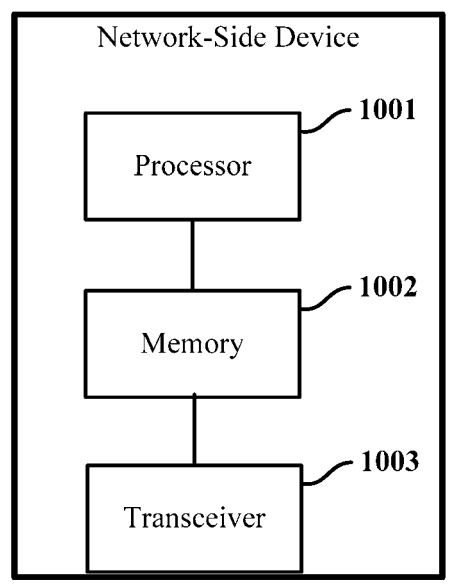
FIG. 10 is yet another schematic view showing the network-side device according to one embodiment of the present disclosure.

As shown in FIG. 10, the present disclosure provides in some embodiments yet another network-side device for the system for reporting movement information, which includes a processor 1001, a memory 1002 and a transceiver 1003. The transceiver 1003 may include such devices as a baseband processing element and a radio frequency processing element for transmitting relevant information in accordance with the practical need. The memory 1002 is configured to store one or more executable programs for configuring the processor. The processor 1001 is configured to determine that the UE is being or has been switched from an idle state into a connection state, and receive the movement information reported by the UE via the transceiver 1003.

Alternatively, the movement information includes first movement information and/or second movement information. The first movement information is information representing a movement state of the UE and determined according to mobility state estimation which is performed on the UE. The second movement information is historical information about cell reselection of the UE.

Alternatively, the movement information includes the first movement information and the second movement information. The processor 1001 is configured to receive the first movement information reported by the UE via the transceiver 1003, transmit configuration information representing that the second movement information needs to be reported to the UE via the transceiver 1003 when it is determined that the network-side device needs to receive the second movement information, and receive the second movement information reported by the UE via the transceiver 1003.

Alternatively, the processor 1001 is further configured to transmit configuration information representing that the second movement information does not need to be reported to the UE via the transceiver 1003, or not perform configuration on the UE, when it is determined that the network-side device does not need to receive the second movement information.

Alternatively, the processor 1001 is further configured to, prior to receiving the first movement information reported by the UE, transmit the configuration information representing that the first movement information needs to be reported to the UE via the transceiver 1003 when it is determined that the network-side device needs to receive the first movement information.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure. A person skilled in the art may make further modifications and improvements without departing from the spirit of the present disclosure, and these modifications and improvements shall also fall within the scope of the present disclosure.

What is claimed is:

1. A method for reporting movement information, comprising steps of:
    determining, by a User Equipment (UE), that the UE is being or has been switched from an idle state into a connection state; and
    reporting, by the UE, movement information of the UE to a network-side device,
    wherein the movement information comprises first movement information and/or second movement information, the first movement information is information representing a movement state of the UE and determined according to mobility state estimation (MSE) which is performed on the UE, and the second movement information is historical information about cell reselection of the UE.

2. The method according to claim 1, wherein
    the movement information comprises the first movement information and the second movement information, and
    the step of reporting, by the UE, the movement information of the UE to the network-side device comprises:
    reporting, by the UE, the first movement information to the network-side device; and
    reporting, by the UE, the second movement information to the network-side device when it is determined that the network-side device needs to receive the second movement information, or
    the movement information comprises the second movement information, and
    the step of reporting, by the UE, the movement information of the UE to the network-side device comprises:
    reporting, by the UE, an empty message to the network-side device; and
    reporting, by the UE, the second movement information to the network-side device when it is determined that the network-side device needs to receive the second movement information.

3. The method according to claim 2, wherein
    when configuration information representing that the second movement information needs to be reported is received by the UE from the network-side device, the UE determines that the network-side device needs to receive the second movement information, and
    when configuration information representing that the second movement information does not need to be reported is received by the UE from the network-side device or no configuration information is received from the network-side device within a predetermined time period after the first movement information has been reported, the UE determines that the network-side device does not need to receive the second movement information.

4. The method according to claim 2, wherein prior to determining by the UE that the network-side device needs to receive the second movement information, the method further comprises reporting, by the UE, information representing whether or not there is the second movement information to the network-side device.

5. The method according to claim 1, wherein prior to reporting by the UE the first movement information to the network-side device, the method further comprises receiving, by the UE, configuration information representing that the first movement information needs to be reported from the network-side device.

6. A method for receiving movement information, comprising steps of:
determining, by a network-side device, that a User Equipment (UE) is being or has been switched from an idle state into a connection state; and
receiving, by the network-side device, movement information reported by the UE,
wherein the movement information comprises first movement information and/or second movement information, the first movement information is information representing a movement state of the UE and determined according to mobility state estimation (MSE) which is performed on the UE, and the second movement information is historical information about cell reselection of the UE.

7. The method according to claim 6, wherein the movement information comprises the first movement information and the second movement information, and
the step of receiving, by the network-side device, the movement information reported by the UE comprises:
receiving, by the network-side device, the first movement information reported by the UE;
transmitting, by the network-side device, configuration information representing that the second movement information needs to be reported to the UE when it is determined that the network-side device needs to receive the second movement information; and
receiving, by the network-side device, the second movement information reported by the UE.

8. The method according to claim 7, further comprising:
transmitting, by the network-side device, configuration information representing that the second movement information does not need to be reported to the UE, or not performing configuration on the UE, when it is determined that the network-side device does not need to receive the second movement information.

9. The method according to claim 8, wherein prior to receiving by the network-side device the first movement information reported by the UE, the method further comprises transmitting, by the network-side device, the configuration information representing that the first movement information needs to be reported to the UE when it is determined that the network-side device needs to receive the first movement information.

10. The method according to claim 7, wherein prior to receiving by the network-side device the first movement information reported by the UE, the method further comprises transmitting, by the network-side device, the configuration information representing that the first movement information needs to be reported to the UE when it is determined that the network-side device needs to receive the first movement information.

11. A User Equipment (UE), comprising a processor, a memory and a transceiver, wherein the memory is configured to store one or more executable programs for configuring the processor, and
the processor is configured with the one or more executable programs, and configured to determine that the UE is being or has been switched from an idle state into a connection state, and report movement information of the UE to a network-side device via the transceiver,
wherein the movement information comprises first movement information and/or second movement information, and
the first movement information is information representing a movement state of the UE and determined according to mobility state estimation (MSE) which is performed on the UE and the second movement information is historical information about cell reselection of the UE.

12. The UE according to claim 11, wherein the movement information comprises the first movement information and the second movement information, and
the processor is configured to report the first movement information to the network-side device via the transceiver, and report the second movement information to the network-side device via the transceiver when it is determined that the network-side device needs to receive the second movement information, or,
the movement information comprises the second movement information, and
the processor is configured to report an empty message to the network-side device via the transceiver, and report the second movement information to the network-side device when it is determined that the network-side device needs to receive the second movement information.

13. The UE according to claim 12, wherein
when configuration information representing that the second movement information needs to be reported is received from the network-side device, the processor determines that the network-side device needs to receive the second movement information, and
when configuration information representing that the second movement information does not need to be reported is received from the network-side device or no configuration information is received from the network-side device within a predetermined time period after the first movement information has been reported, the processor determines that the network-side device does not need to receive the second movement information.

14. The UE according to claim 12, wherein the processor is further configured to, prior to determining that the network-side device needs to receive the second movement information, report information representing whether or not there is the second movement information of the UE to the network-side device via the transceiver.

15. The UE according to claim 11, wherein the processor is further configured to, when configuration information representing that the first movement information needs to be reported is received from the network-side device, report the first movement information to the network-side device via the transceiver.

* * * * *